United States Patent Office 2,808,349
Patented Oct. 1, 1957

2,808,349

TEXTILE AND OTHER SHAPED PRODUCTS HAVING ANTISTATIC QUALITIES AND METHODS OF PRODUCING THEM

Sidney Melamed, Philadelphia, Pa., assignor to Rohm & Haas Company, Philadelphia, Pa., a corporation of Delaware No Drawing. Application March 21, 1955,
Serial No. 495,786

14 Claims. (Cl. 117—139.5)

This invention relates to the production of shaped articles, such as films, sheets, textile fibrous structures, of hydrophobic materials having a durable antistatic finish thereon.

Quaternary ammonium compounds have heretofore been used for the treatment of hydrophobic articles such as textile materials for reducing the tendency of such hydrophobic articles to develop static electric charges thereon during the handling thereof. Many of such compounds, however, are adapted to provide antistatic qualities on treated articles only temporarily since they are readily removable by such customary operations as washing, scouring or dry-cleaning.

It is an object of the present invention to provide a novel group of quaternary ammonium compounds which, though water-soluble or readily water-dispersible initially, have the advantage of being curable to an insoluble condition wherein they are resistant to washing and dry-cleaning operations. A further object is to provide such quaternary ammonium compounds that may be cured to insoluble condition either by heating at elevated temperatures or by prolonged ageing under normal conditions of storage at ambient room temperatures. Other objects and advantages will be apparent from the description of the invention hereinafter.

According to the present invention, the development of static electrical charges on hydrophobic materials is reduced by the application of certain polymeric quaternary ammonium compounds to such materials and this antistatic quality can be made durable in character by merely ageing the dried treated material at normal room temperature while exposed to air, oxygen, or any oxygen-containing gas or by heating the polymeric compounds in situ on the hydrophobic materials at a temperature of at least about 220° F. while exposed to air, oxygen, or any oxygen-containing gas to cure or insolubilize the compounds.

The quaternary compounds that are capable of producing durable antistatic finishes in this way are those water-soluble addition polymers of monoethylenically unsaturated molecules comprising 30% to 100% by weight of molecules having the structure of the general Formula I:

I 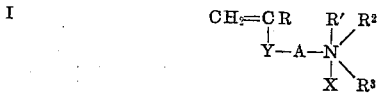

where R is hydrogen or methyl; Y is O, CONR, or COO; A is a straight-chain or branched-chain alkylene group having 2 to 10 carbon atoms which may be substituted by one or more hydroxyl groups, at least two of the carbon atoms thereof being connected in a chain between the N atom and Y group of the formula; R' and R² may be (1) separate groups selected individually from the group consisting of saturated and ethylenically unsaturated hydrocarbon groups of 1 to 4 carbon atoms, and (2) a single group selected from the morpholino residue $:(C_2H_4)_2O$, the pyrrolidino residue $—C_4H_8—$, the piperidino residue, $—C_5H_{10}—$, and an N-alkyl piperazino residue $:(C_2H_4)_2:NR°$ where R° is an alkyl group of 1 to 18 carbon atoms, such as methyl, ethyl, isopropyl; R³ is allyl or methallyl, and X is a negative, salt-forming atom or radical, such as one of the halides, e. g. bromide, chloride, iodide, allyl sulfate ($CH_2:CHCH_2OSO_3$), diallyl phosphate $((CH_2:CHCH_2O)_2PO_2)$, and the tosyl (p-toluene-sulfonate) radical.

An essential characteristic of the polymers of the invention is their capability of being cured to an insoluble condition and this is believed to be attributable to the unsaturated nature of the allyl or methallyl groups which serve as the substituent designated R³ in Formula I. Unsaturation in groups R', R² and A may, if present, also contribute to this essential property. However, it is to be understood that the invention is not to be limited to any particular theory of operation.

The polymers may contain up to 70% by weight of one or more other comonomers such as acrylonitrile, the vinyl aromatic compounds, more particularly the vinyl aromatic hydrocarbons (e. g., styrene, isopropenyl toluene, the various dialkyl styrenes, etc.), other aliphatic compounds containing a $CH_2=C=$ grouping, e. g., the various substituted acrylonitriles (e. g., methacrylonitrile, ethacrylonitrile, phenylacrylonitrile, etc.), acrylamide and the various substituted acrylamides (e. g., methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e. g. N-monomethyl, -ethyl, -propyl, -butyl, etc. and N-dimethyl, -ethyl, -proply, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, etc., esters of an acrylic acid (including acrylic acid itself and the various α-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec-butyl, tert-butyl, amyl, hexyl, heptyl, octyl, decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C=$ grouping.

The polymers may be made by polymerizing or copolymerizing an amine having the structure of Formula II:

II 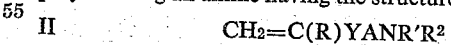

where the symbols have the same definition as before, and then quaternizing part or all of the tertiary nitrogen groups, to provide at least 30% by weight of quaternized monomeric units in the polymer, by means of allyl or methallyl bromide, chloride, iodide, sulfate, phosphate, or allyl or methallyl p-toluene-sulfonate.

Any known procedure for polymerizing the compounds may be employed either for polymerizing the amine before quaternization or the quaternized monomer. For example, various free radical catalysts may be used such as hydrogen peroxide, organic peroxide, such as butyl perbenzoate or benzyl peroxide or azo catalysts such as azodiisobutylonitrile. Such catalysts may be employed for polymerization in bulk or in solution. On the other hand, if polymerization is to be effected on emulsions or dispersions of the monomers, ammonium persulfate or alkali metal persulfates may be employed. Polymerization may be effected at 60° to 100° C. and the amount of catalyst or initiator may be from 0.1% to about 20% by weight of the monomer or monomers. Polymerization may be carried out in an inert atmosphere such as nitrogen. The quaternization of the monomer or of the polymer is preferably effected in a polar solvent such as water, ethanol, acetonitrile, dimethylformamide, or glycol ethers such as ethoxyethylhydroxyethyl ether or mixtures of one of these solvents with benzene or toluene at a temperature of 40° to 100° C. for a period of about two to twelve hours. The allyl or methallyl chloride or the like may be used in a quantity that is molarly equivalent to the total number of amine groups in the polymer to quaternize all of such groups. However, when more than 30% by weight of the monomeric units contain a quaternizable amine group, it is unnecessary to quaternize all of such amine groups and the amount of quaternizing agent may be less than the amount required to quaternize all of the amine groups in the polymer provided sufficient is used to provide 30% by weight of quaternized monomeric units in the final polymer.

The molecular weight of the final quaternized polymer is not critical. It may vary from as few as 10 monomeric units to a molecular weight of the order of 500,000 or more.

These antistatic compounds are of polymeric character and generally are water-soluble or readily dispersible in water. Those in which the hydrocarbon substituents A, R', and R² are of long-chain or high carbon content have somewhat less water-solubility and may require the assistance of a dispersing agent, such as ethylene oxide modified long-chain alkyl phenol, such as tert-octylphenoxy-polyethoxyethanols containing from 8 to 40 oxyethylene units.

Because of the water-solubility or easy dispersibility in water of the quaternary compounds of the present invention, they have the advantage that they may be applied to the articles to be treated by means of aqueous solutions or dispersions. Generally, such dispersions may contain from 2% to 10% by weight of the quaternary ammonium compound. If desired, however, the antistatic compounds may be dissolved in polar organic solvents, such as the lower alcohols, especially ethanol, methanol and isopropanol. Similarly, 2% to 10% by weight of the compounds is advantageously employed. The solutions, especially when a polar organic solvent is used, may also contain a small amount of a metallic dryer, such as the cobalt, manganese, or lead salts of one or more fatty acids, such as stearates. Generally, such metallic dryers are unnecessary, but when cure is effected by ageing at normal room temperatures, they may be used advantageously to accelerate the curing action.

The antistatic compounds of the present invention may be applied to shaped articles of any hydrophobic material, especially of such polymeric materials as cellulose derivatives, especially cellulose esters like cellulose acetate and cellulose acetobutyrate, resinous condensation polymers or addition polymers including polyamides, like nylon of either the 66 type or caprolactam type, polyesters such as ethylene glycol terephthalate, and vinyl and acrylic polymers such as polyethylene, polytetrafluoroethylene, polytrifluorochloroethylene, polyvinyl chloride, polyvinylidene chloride, polyisobutylene, polystyrene, copolymers of vinyl chloride with vinyl acetate, vinylidene chloride, acrylonitrile, and acrylic esters, also polymers of acrylonitrile, methacrylonitrile, copolymerized with vinyl chloride, vinylidene chloride, vinyl acetate, vinyl pyridines, and so on, polymers of acrylic and methacrylic esters of alcohols having from 1 to 18 carbon atoms, such as methanol, ethanol, butanol, tert-octanol and dodecanol as well as copolymers of such acrylic and methacrylic acid esters with acrylonitrile, vinyl chloride, styrene, vinyl acetate, maleic acid esters and so on.

The hydrophobic material may have any form whatsoever such as the form of a film or sheet, solid rolls or tubes, but the invention is especially applicable to the handling of textile structures including fibers, filaments, yarns, cords and fabrics made therefrom, including woven, knitted, felted, braided and otherwise interlocked fibers, filaments or yarns. In the following description, reference will be made to a textile fabric as the material treated to reduce static charges. However, the general outline of procedural details applies as well to structures of the other types mentioned.

Thus, a textile fabric may be treated with the aqueous or organic solvent solution of the antistatic compound in a textile pad or by applying the solution by means of sprays, brushes, transfer rollers or the like. Excess solution may be removed by wiping, squeegeeing, squeezing or by shaking or vibrating.

After application of the solution and removal of excess, if such removal is desired, the treated fabric may be dried in the air such as for a period of 10 or 15 minutes when a polar organic solvent is used or for as much as ½ hour or an hour or more when aqueous solutions are used. If desired, forced drying at elevated temperatures up to about 212° F. may be employed, in all cases keeping the temperature of the fabric or other article below its temperature of decomposition and also below the point at which it would tend to soften or become tacky or shrink. This depends on the particular material being treated.

When the textile material is sensitive to elevated temperatures, the curing of the quaternary ammonium compound thereon may be effected merely by prolonged storage at normal room temperature or if desired at somewhat elevated temperatures within the drying range just mentioned. However, many hydrophobic materials of the type mentioned above are unharmed at temperatures even up to 450° F. provided the time of such treatment at elevated temperatures is not excessive. The curing of the quaternary ammonium compounds on such materials may be accelerated by heating the treated materials at temperatures of 220° F. to about 450° F. A time of one to five hours may be employed at the lower limit of the temperature range and a few seconds such as two to ten seconds may be employed at the upper limit of the range. Generally, an intermediate temperature is preferable and a period of about one to ten minutes is adequate for curing the materials at temperatures of 290° to 310° F.

In the following examples which are illustrative of the invention, the parts and percentages are by weight unless otherwise noted:

*Example 1*

(a) There is charged into a reaction vessel 2,090 grams of a 53.5% solution in toluene of methyl polyacrylate (13 moles) (molecular weight of 15,000 to 25,000), having a Gardner-Holdt viscosity of $Z_4+$ (75 poises) as a 50% solution in toluene at 25° C. Then 500 grams of toluene are removed by stirring and heating (steam bath) the solution at reduced pressure (30 to 50 mm.). To the viscous, colorless polymer solution that remains, there is added 755 grams of dimethylaminopropylamine (7½ moles) and 200 ml. of butanol, and the mixture is heated with stirring until homogeneous. A solution of 200 grams of a 25% solution of sodium methoxide in methanol (5% methoxide on polyacrylate) is diluted with 200 ml. of butanol and added dropwise to the hot solution. This addition is performed slowly to avoid gelation of the polymer. The final mixture is heated to reflux for 16 hours.

(b) The resulting solution (in which the polymer is approximately 57% aminolyzed) is diluted with 15 liters of absolute ethanol and stirred at 80° to 85° C. until the solution is homogeneous. At this temperature, 7½ moles of allyl chloride are added slowly. The resulting solution is heated at 80° to 85° C. for about 12 hours. The quaternary compound, isolated by evaporating the solvent, slurrying the solid residue with petroleum ether, and drying, is a light tan colored powder readily soluble in water.

(c) Fabrics of nylon, polyethylene terephthalate (Dacron) and a polymer of acrylonitrile having about 90% of acrylonitrile therein (Orlon) were padded through a 5% solution in water of the quaternary ammonium compound obtained in part (b) hereof. After air drying the fabrics, they were cured at 300° F. for 10 minutes. The treated fabrics exhibited marked reduction in tendency to develop static charges and on retesting this quality after five launderings, there was no appreciable loss in the antistatic quality.

*Example 2*

The procedure of Example 1, parts (a) and (b), was repeated except that the amount of allyl chloride was reduced to 4½ moles so that in the polymer obtained approximately 58% of the amine groups were quaternized. The resulting polymer was applied to nylon, Orlon, and Dacron fabrics by the procedure of Example 1 (c) with similar results in obtaining an antistatic quality and durability thereof.

*Example 3*

The procedure of Example 1(a) was repeated except that the amount of amine was increased from 755 grams (7½ moles) to 1326 grams (13 moles). The resulting polymer was quaternized by means of 13 moles of allyl chloride by the procedure of Example 1(b). The quaternized polymer thereby obtained was applied to fabrics of nylon, Orlon, and Dacron by the procedure of Example 1(c) with similar results.

*Example 4*

The procedure of Example 1(a) was repeated except that the amount of amine was reduced from 755 grams (7½ moles) to 253 grams (4½ moles). The resulting polymer was quaternized by means of 4½ moles of allyl chloride by the procedure of Example 1(b). The quaternized polymer thereby obtained was applied to fabrics of nylon, Orlon, and Dacron by the procedure of Example 1(c) with similar results.

*Example 5*

The procedures of Examples 1 through 4 were repeated except that instead of applying the quaternary ammonium compounds of the several examples as 5% aqueous solutions, they were applied as 5% solutions in isopropanol to which there was added 2.2 ml. of a 6% solution of cobalt naphthenate in mineral thinner per 100 grams of the isopropanol solution. On drying and curing as in the preceding examples, the results in antistatic quality and durability thereof were substantially the same as in the preceding examples.

*Example 6*

(a) A copolymer of methyl methacrylate and methyl acrylate containing 5 mole percent of the latter is dissolved in excess aminopropylpiperidine and heated at 115° for 24 hours. A sample is removed and the product isolated by precipitation and washing with methanol. Nitrogen analysis indicates the presence of approximately 5 mole percent of amide. The remainder of the mixture is heated to 180° to 200° C. for 3 to 4 hours. This time the product is isolated by washing with petroleum ether. The resulting tan solid is soluble in methanol and dilute hydrochloric acid. Nitrogen analysis indicates that 60% of the polymer is amide.

(b) The 60% aminolyzed copolymer of part (a) is quaternized by an equivalent amount of methallyl bromide by the procedure of Example 1(b). The quaternary compound thus obtained was applied by the procedure of Example 1(c) except that the concentration in the aqueous solution was raised to 10%. The reduction in tendency to develop static charges was somewhat greater than that obtained in Example 1(c).

*Example 7*

(a) Butyl acrylate and methyl acrylate are copolymerized in a molar ratio of 80/20. The polymer is dissolved in dimethyl-formamide to give a 50% solution and a molar equivalent of N-dimethylaminoethyl-N-butylamine is added. The resultant solution is heated at 150° to 160° C. for 48 hours. The polymer is isolated by precipitation with water and dried. Nitrogen content indicates that 40% of the ester groups present have been converted to amide.

(b) The polymer obtained in part (a) hereof is quaternized by an equivalent amount of methallyl sulfate essentially by the procedure of Example 1(b). The polymer obtained was applied to nylon, Dacron, and Orlon fabrics from a 2% aqueous solution and the treated fabrics were dried and cured as in part (a). The reduction in tendency to develop static charges was not quite as high as that obtained in Example 1 but it was fully as durable.

*Example 8*

A copolymer of acrylic acid and methyl acrylate containing 5 mole percent of acrylic acid is dissolved in excess aminopropyl morpholine and converted to amide by heating at 110° C. for 48 hours. Excess amine is removed by ion-exchanging a solution of the polymer with an acid exchange resin. The polymer obtained is alkylated with allyl p-toluene-sulfonate used in an amount equivalent to the amine groups in the polymer by the general procedure of Example 1(b). The quaternized copolymer thereby obtained was applied to nylon, Orlon, and Dacron fabrics by the procedure of Example 1(c) with similar results in reducing static tendencies and providing durability in such anti-static quality.

*Example 9*

A homopolymer of dimethylaminoethyl vinyl ether is alkylated by means of allyl bromide and applied to a polyethylene film by means of a 5% aqueous solution. After air drying and ageing at normal room temperature for a week, it was found that the tendency of the polyethylene film to develop static charges was markedly reduced and that substantially no loss in antistatic quality was caused by washing with soap.

*Example 10*

A homopolymer of 8-(dimethylamino)octyl vinyl ether was alkylated as in Example 9 and applied to fabrics of nylon by the procedure of Example 5. The results obtained were similar to those obtained in Example 5.

*Example 11*

A copolymer of 30 mole percent of dibutylaminoethyl vinyl ether and 70 mole percent of vinyl acetate is quaternized by means of triallyl phosphate used in an amount equivalent to the amine groups in the polymer. The quaternized polymer was applied to nylon, Orlon, and Dacron fabrics by the procedure of Example 1(c) with similar results.

*Example 12*

A homopolymer of 2-morpholinoethyl vinyl ether is quaternized with diallyl sulfate used in one-half the equivalent amount required to quaternize the amine groups in the polymer. The quaternized polymer thus obtained was applied to nylon fabrics from a 5% aqueous solution thereof. After drying, the polymer was cured by heating to 400° F. for 15 seconds.

Example 13

A homopolymer of N-vinyloxyethyl-N'-methylpiperazine of the formula

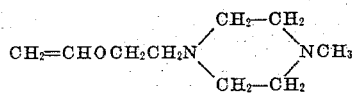

is quaternized with an amount of allyl chloride equivalent to one-half of all of the nitrogen atoms in the polymer so that a mixture was obtained comprising a predominant proportion of polymer molecules in which only one of the nitrogen atoms of the piperazine ring is quaternized. Another batch of the same polymer was quaternized with sufficient allyl chloride to quaternize both nitrogen atoms of the piperazine ring of the polymer.

Nylon fabrics were padded with 5% aqueous solutions of each of the quaternized polymers thereby obtained, dried and then heated to 220° F. for a period of one hour. The nylon fabrics had reduced tendencies to develop static charges and the antistatic character was durable against washing.

Example 14

A copolymer of 50% of the piperazine of Example 13 with 50% of N-vinyloxyethyl-N'-octadecylpiperazine was quaternized with methallyl chloride in an amount equivalent to one-half the nitrogen atoms in the copolymer. Yarns of nylon, Dacron, Orlon, and cellulose acetate were passed through a bath containing 7% by weight of the quaternized copolymer in the size box of a slasher. After squeezing out excess on the slasher and drying thereon, the yarns were heated to 300° C. for about three minutes. All of the yarns showed marked reduction in tendency to develop static charges on passing through guides and knitting machines and looms.

Example 15

A copolymer of 60% of methyl acrylate with 40% by weight of dimethylaminoethyl acrylate is quaternized by the procedure of Example 1(b). A cellulose acetate butyrate film was passed through a 3% aqueous solution of the quaternary polymer, dried and heated to 240° F. for 30 minutes. An antistatic finish durable to washing was obtained on the film.

Example 16

A copolymer of 30% of methyl methcrylate with 70% of dimethylaminoethyl acrylate was quaternized by the process of Example 1(b) and cellulose acetate fibers were sprayed with a 4% aqueous solution of the quaternized polymer. After drying the treated fibers were heated to 240° F. for 30 minutes. The fibers exhibited reduced tendencies to develop static charges on carding, drafting and spinning and twisting operations. The antistatic finish was not appreciably effected by scouring operations so that the final fabric obtained after scouring still exhibited its antistatic quality.

Example 17

A copolymer of 20% butyl acrylate and 80% of 2-pyrrolidinoethyl acrylate was quaternized with methallyl chloride equivalent to all of the amino groups in the copolymer. Nylon fibers were treated by spraying a 6% solution of the quaternized polymer thereon, air drying, and heating to 350° F. for one minute. A durable antistatic finish was obtained on the fibers which made them more amenable to carding, twisting, spinning and drafting operations.

Example 18

A copolymer of 30% styrene and 70% ethyl acrylate is dissolved in excess N-aminoethylpyrrolidine and heated at 115° C. for 24 hours whereby substantially all of the ethyl acrylate component was aminolyzed. The copolymer was quaternized with allyl chloride equivalent to all of the amino nitrogen in the copolymer; the quaternized copolymer thus obtained was dissolved in water to provide a 5% solution thereof which was sprayed on Orlon fibers which were then air dried and heated to a temperature of 230° F. for 45 minutes. A durable antistatic finish was obtained rendering the fibers more amenable to carding and spinning operations.

Example 19

A copolymer of 15% of ethyl acrylate with 85% of 3-(dimethylamino)-2-hydroxypropyl acrylate is alkylated by the procedure of Example 1(b). Then a 5% solution thereof in water is sprayed on Dacron fibers which were then air dried and heated to a temperature of 290° F. for a period of ten minutes. The fibers showed reduced tendency to develop static charges and, hence, were more amenable to such processing operations as carding, spinning, drafting and twisting.

It is to be understood that changes and variations may be made without departing from the spirit and scope of the invention as defined in the appended claims.

I claim:

1. An article of manufacture comprising a shaped article formed of a hydrophobic material which in dry condition normally tends to develop static charges of electricity thereon, the surface of the material carrying adhered thereon, for the purpose of reducing the tendency of the article to develop static charges, a polymer of monoethylenically unsaturated molecules comprising at least 30% by weight of monomeric molecules having the structure of the formula

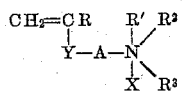

where R is selected from the group consisting of hydrogen and methyl; Y is selected from the group consisting of O, CONR, and COO; A is selected from the group consisting of alkylene groups having 2 to 10 carbon atoms and such groups substituted by hydroxyl, at least two of the carbon atoms thereof being connected in a chain between the N atom and Y group of the formula; R' and R² are selected from the group consisting of (1) separate groups selected individually from the group consisting of saturated and ethylenically unsaturated hydrocarbon groups of 1 to 4 carbon atoms, and (2) composite groups which together with the N atom form a heterocyclic group selected from the group consisting of those having the formula $=(CH_2CH_2)_2O$, $—(CH_2)_4—$, $—(CH_2)_5—$, and $=(CH_2CH_2)_2=NR°$, where R° is an alkyl group having 1 to 18 carbon atoms; R³ is selected from the group consisting of allyl and methallyl, and X is selected from the group consisting of negative, salt-forming atoms and radicals.

2. An article of manufacture comprising a shaped article formed of a hydrophobic material which in dry condition normally tends to develop static charges of electricity thereon, the surface of the material carrying adhered thereon a polymer of monoethylenically unsaturated molecules comprising at least 30% by weight of monomeric molecules having the structure of the formula as defined in claim 1 cured to an insoluble condition whereby the article has a reduced tendency to develop static charges thereon and the polymer is resistant to removal by normal laundering operations.

3. An article of manufacture comprising a textile material of a hydrophobic polymeric material which in dry condition normally tends to develop static charges of electricity thereon, the surface of the material carrying adhered thereon an insolubilized polymer of monethylenically unsaturated molecules comprising at least 30% by weight of monomeric molecules having the structure of the formula as defined in claim 1 whereby the article has a reduced tendency to develop static charges thereon and the polymer is resistant to removal by normal laundering operations.

4. An article as defined in claim 3 in which the initial polymer comprises monomeric units of the formula

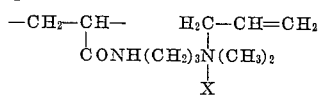

in which X is selected from the group consisting of negative, salt-forming atoms and radicals.

5. An article as defined in claim 3 in which the initial polymer comprises monomeric units of the formula

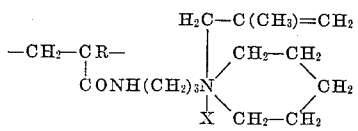

in which R is selected from the group consisting of hydrogen and methyl and X is selected from the group consisting of negative, salt-forming atoms and radicals.

6. An article as defined in claim 3 in which the initial polymer comprises monomeric units of the formula

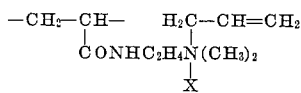

in which X is selected from the group consisting of negative, salt-forming atoms and radicals.

7. An article as defined in claim 3 in which the initial polymer comprises units of the formula

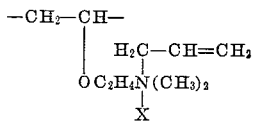

in which X is selected from the group consisting of negative, salt-forming atoms and radicals.

8. An article as defined in claim 3 in which the initial polymer comprises monomeric units of the formula

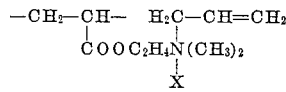

in which X is selected from the group consisting of negative, salt-forming atoms and radicals.

9. A method for treating an article formed of hydrophobic material which in dry condition normally tends to develop static charges of electricity thereon which comprises applying thereto a solution containing at least about 2% of a water-dispersible polymer of monoethylenically unsaturated molecules comprising at least 30% by weight of molecules having the structure of the formula as defined in claim 1, and drying the treated article in the presence of an oxygen-containing gas.

10. A method for treating a textile article comprising hydrophobic fibrous material which in dry condition normally tends to develop static charges of electricity thereon which comprises applying thereto a solution containing at least about 2% of a water-dispersible polymer of monoethylenically unsaturated molecules comprising at least 30% by weight of molecules having the structure of the formula as defined in claim 1, drying the treated article, and curing the polymer to insoluble condition in the presence of an oxygen-containing gas.

11. A method for treating a textile article comprising hydrophobic fibrous material which in dry condition normally tends to develop static charges of electricity thereon which comprises applying thereto a solution containing at least about 2% of a water-dispersible polymer of monoethylenically unsaturated molecules comprising at least 30% by weight of molecules having the structure of the formula as defined in claim 1, and drying the treated article, and curing the polymer to insoluble condition by heating the dried article in the presence of an oxygen-containing gas to a temperature of at least 220° F.

12. A method for treating a textile article comprising hydrophobic fibrous material which in dry condition normally tends to develop static charges of electricity thereon which comprises applying thereto a solution containing at least about 2% of a water-dispersible polymer of monoethylenically unsaturated molecules comprising at least 30% by weight of molecules having the structure of the formula as defined in claim 1, and drying the treated article, and curing the polymer to insoluble condition by heated the dried article in the presence of an oxygen-containing gas to a temperature of at least 220° F. up to about 450° F. for a period of time generally inversely proportional to the temperature.

13. The method of claim 12 in which the polymer is applied to the textile material in an aqueous solution containing about 2% to 10% thereof.

14. The method of claim 12 in which the polymer is applied to the textile material in a polar organic solvent solution containing about 2% to 10% thereof.

References Cited in the file of this patent

UNITED STATES PATENTS 2,595,225    Coffman _____ May 6, 1952
2,626,877    Carnes _____ Jan. 27, 1953